(12) United States Patent  (10) Patent No.: US 8,326,962 B2
Lo  (45) Date of Patent: Dec. 4, 2012

(54) METHOD, SYSTEM AND APPARATUS FOR PROVIDING AUTOMATION MANAGEMENT SERVICES

(75) Inventor: Ren-Yi Lo, Monmouth Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 197 days.

(21) Appl. No.: 12/827,086

(22) Filed: Jun. 30, 2010

(65) Prior Publication Data

US 2011/0004679 A1 Jan. 6, 2011

Related U.S. Application Data

(60) Provisional application No. 61/222,237, filed on Jul. 1, 2009.

(51) Int. Cl.
*G06F 15/173* (2006.01)
*G06F 15/177* (2006.01)

(52) U.S. Cl. ........ 709/223; 709/221; 709/224; 709/226; 709/232; 709/219; 726/1; 726/23; 370/230; 370/254; 370/255; 370/389; 370/252

(58) Field of Classification Search .................. 709/203, 709/223, 246, 238, 227, 239, 241, 245, 202, 709/231

See application file for complete search history.

(56) References Cited

U.S. PATENT DOCUMENTS

| | | | |
|---|---|---|---|
| 6,115,646 A * | 9/2000 | Fiszman et al. | 700/181 |
| 6,216,173 B1 * | 4/2001 | Jones et al. | 715/705 |
| 6,263,255 B1 | 7/2001 | Tan et al. | |
| 6,687,220 B1 * | 2/2004 | Ayres | 370/229 |
| 6,973,622 B1 * | 12/2005 | Rappaport et al. | 715/735 |
| 2001/0025294 A1 | 9/2001 | Stripf et al. | |
| 2005/0262232 A1 * | 11/2005 | Cuervo et al. | 709/223 |
| 2007/0008970 A1 * | 1/2007 | Alex et al. | 370/392 |
| 2007/0116189 A1 * | 5/2007 | Clawson | 379/37 |
| 2009/0252173 A1 * | 10/2009 | Sampath et al. | 370/400 |
| 2010/0235914 A1 * | 9/2010 | Proulx | 726/23 |
| 2010/0309907 A1 * | 12/2010 | Proulx et al. | 370/389 |
| 2011/0004679 A1 * | 1/2011 | Lo | 709/223 |

FOREIGN PATENT DOCUMENTS

EP 0 973 078 A1 1/2001

OTHER PUBLICATIONS

Lefhalm et al., "A full featured monitoring, control and data management system for liquid metal coolant loops", Real Time Conference, 2005, 14th IEEE-NPSS Stockholm, Sweden, Jun. 4-10, 2005, Piscataway, NJ, IEEE, Jun. 4, 2005, pp. 570-573.
International Search Report and Written Opinion dated Sep. 22, 2010.

* cited by examiner

*Primary Examiner* — Jude Jean Gilles

(57) ABSTRACT

An automation management system is deployed and operates on a plurality of network devices in a network in a distributed manner. The plurality of network devices may comprise a plurality of routers, for example. Automation management services are deployed and operate on the network devices in accordance with a service-oriented architecture model. At least one of the services may comprise a first instance of the service deployed on a first network device and a second instance of the service deployed on a second network device. Methods for deploying and operating an automation management system on a plurality of network devices in a network are also provided.

17 Claims, 14 Drawing Sheets

METHOD, SYSTEM AND APPARATUS FOR PROVIDING AUTOMATION MANAGEMENT SERVICES

This application claims the benefit of U.S. Provisional Application No. 61/222,237, filed Jul. 1, 2009, the disclosure of which is herein incorporated by reference.

FIELD OF THE INVENTION

This application relates generally to the deployment and operation of an automation management system, and more particularly, to the deployment and operation of an automation management system on a plurality of network devices in a network.

BACKGROUND

Automation management systems are used to automate processes in a variety of fields such as manufacturing, the energy industry, and in building management. For example, building management systems are commonly used within buildings and other facilities to manage and control certain building systems such as alarm services, HVAC, lighting, heating, etc. These systems may consist of multiple, integrated subsystems employing large numbers of elements, and are typically controlled by computer. There is a continuing need for improved methods and systems for providing automation management systems services.

SUMMARY

In accordance with embodiments of the invention, a system for providing automation management services is provided. The system comprises a plurality of network devices in a network, and an automation management system deployed on the network devices in a distributed manner. The plurality of network devices may comprise a plurality of routers, for example. The automation management system may comprise a plurality of services deployed on the network devices. At least one of the services may comprise a first instance of the service deployed on a first network device and a second instance of the service deployed on a second network device.

In accordance with another embodiment of the invention, a method for providing automation management services is provided. An automation management system operates on a plurality of network devices in a network in a distributed manner using a service oriented architecture. The plurality of network devices may comprise a plurality of routers, for example. At least one automation management service is provided with respect to at least one process object within a defined process image. A plurality of services may be deployed and operate on the network devices. The plurality of services may comprise one or more of the following: a monitoring and control service, a configuration service, a gateway service, an alarm service, an archiving service, and a service registry. In one example, the plurality of services comprises a configuration service configured to maintain information relating to a process image. The plurality of services may comprise services relating to one of: a building management system, an industrial automation system, and an energy systems management system. The plurality of services may be deployed and operate on the network devices in accordance with a service-oriented architecture model. At least one of the services may comprise a first instance and a second instance that is redundant to the first instance.

Operation of an automation management system on a network of network devices may comprise deploying and operating a plurality of services on the plurality of network devices. The plurality of services may be deployed and operate on the plurality of network devices in accordance with a service-oriented architecture model. In one example, a first instance of a service is deployed and operates on a first network device, and a second instance of the service is deployed and operates on a second network device. In another example, a first instance of a service is deployed and operates on a first network device, and a second instance of the service that is redundant to the first instance is deployed and operates on a second network device.

Deployment and operation of the automation management system may comprise configuring one or more service instances. In one embodiment, an instance of a configuration service in the automation management system s configured by communicating with a registry service operating in the automation management system, by the configuration service instance, in order to make itself discoverable, and populating the configuration service instance with a set of rules defining how to distribute process objects to instances of services.

In another embodiment, an instance of an automation and control service in the automation management system is configured by communicating with a registry service operating in the automation management system, by the automation and control service instance, in order to make itself discoverable, and receiving, from the registry service, information identifying a configuration service in the automation system management system. A profile is uploaded to the configuration service, and configuration data is downloaded from the configuration service.

In another embodiment. a redundant configuration service in the automation management system is synchronized by receiving, by an instance of a configuration service, from a service registry, information identifying one or more redundant instances of the configuration service, and selecting, based on a load balancing strategy, one of the one or more redundant instances. Configuration information is downloaded from the selected redundant instance.

In another embodiment, load balancing is performed within the automation management system by multicasting, by an instance of a first service operating in the automation management system, a request to a plurality of redundant instances of a second service in the automation management system. Responses are received from the plurality of redundant instances, with differing delays, and a service instance is selected based on the received responses.

These and other advantages of the present disclosure will be apparent to those of ordinary skill in the art by reference to the following Detailed Description and the accompanying drawings.

DETAILED DESCRIPTION

In accordance with an embodiment of the invention, a system for providing automation management services is provided. The system comprises a plurality of network devices in a network, and an automation management system deployed and operating on the network devices in a distributed manner. A network device may be a router, a switch, a hub, etc. Automation management services are deployed and operate on the network devices in accordance with a service-oriented architecture model.

Figure 1:
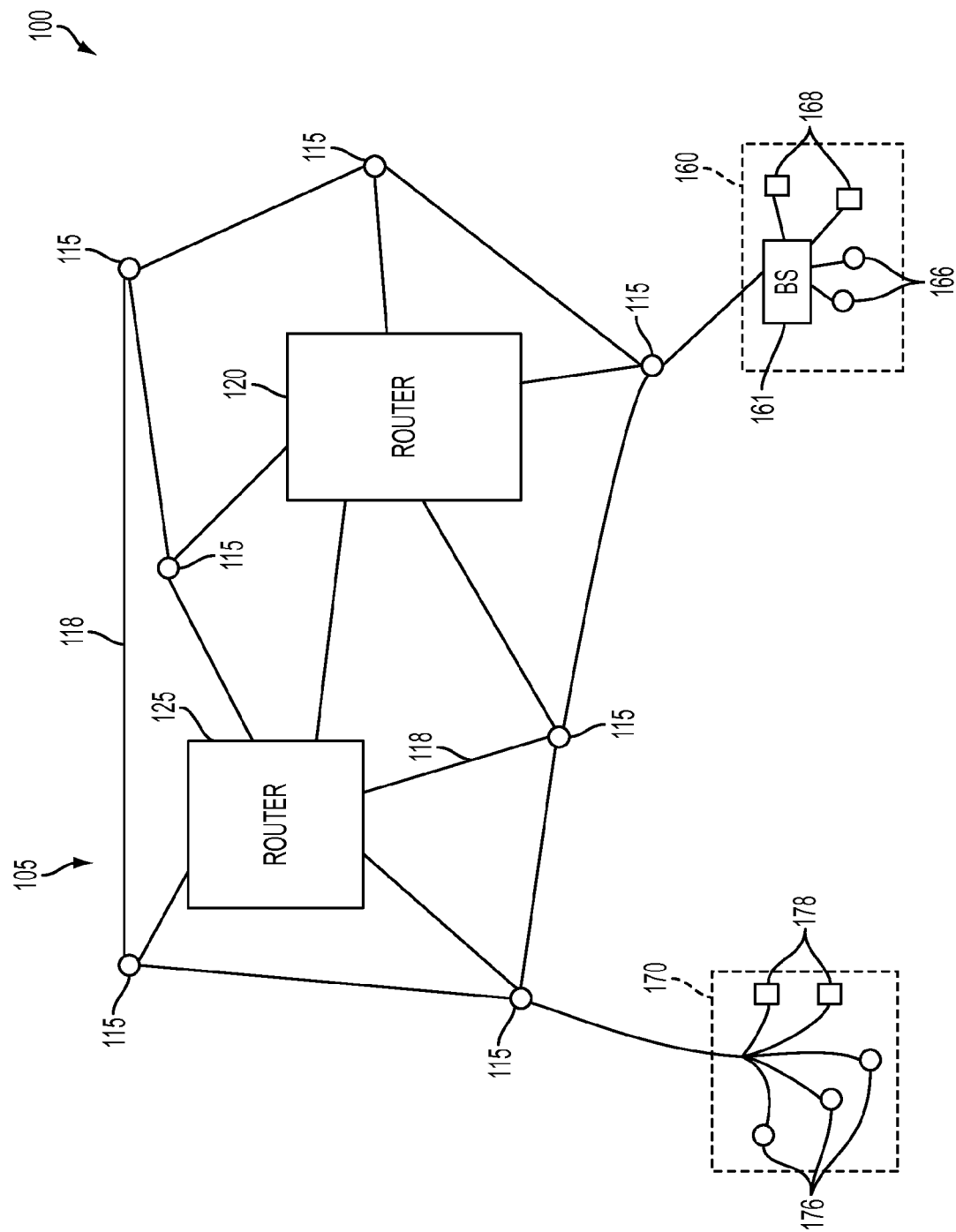
FIG. 1 shows a communication system that may be used to deploy an automation management system, in accordance with an embodiment of the invention.

FIG. 1 shows a communication system 100 that may be used to deploy and operate an automation management system, in accordance with an embodiment of the invention. Communication system 100 comprises a network 105, a first area 160 and a second area 170.

Network 105 comprises a plurality of nodes 115 connected by links 118. Each node 115 comprises at least one network device capable of receiving, sending and forwarding information within network 105. The plurality of network devices within network 105 are linked within network 105, forming a network of network devices.

In the exemplary embodiment of FIG. 1, network 105 comprises a plurality of routers, of which two (routers 120, 125) are shown. The plurality of routers within network 105 are linked within network 105, forming a network of routers. While two routers are shown in FIG. 1, network 105 may include any number of routers. In addition to routers, network 105 may also comprise any number of other network devices, such as switches, hubs, etc.

Network 105 may comprise one or more of a number of different types of networks, such as, for example, the Internet, an intranet, a local area network (LAN), a wide area network (WAN), an internet, Fibre Channel-based storage area network (SAN) or Ethernet. Other networks may be used. Alternatively, network 105 may comprise a combination of different types of networks.

Area 160 is a first location in which an automation management system is deployed and operates to manage and control one or more processes. Area 160 comprises a plurality of sensors 166 used to measure selected aspects of area 160 (such as the speed of a fan, a water level in a tank, a temperature of a room etc.) and a plurality of actuators 68, such as switches, used to control devices. In this example, sensors 166 and actuators 168 are connected to network 105 via a base station 161. Alternatively, sensors 166 and actuators 168 may be connected to network 105 via a programmable logic controller ("PLC"), a field control panel, a terminal equipment controller ("TEC"), or other device.

Area 170 is a second location comprising a plurality of sensors 176 used to measure selected aspects of area 170 (such as the speed of a fan, a water level in a tank, a temperature of a room, etc.) and a plurality of actuators 178, such as switches, used to control devices. In the embodiment of FIG. 1, sensors 176 and actuators 178 are connected directly to network 105 and communicate with devices within network 105 using appropriate protocols such as IP protocols.

In an exemplary embodiment, area 160 is a first building and area 170 is a second building. Areas 160 and 170 may be respective buildings located on a university campus, for example. An automation management system deployed within communication system 100 is used to provide building management services (and other types of automation management services) to manage and control various systems within areas 160, 170. In other embodiments, areas 160, 170 may comprise any area where automation management services are used. For example, areas 160, 170 may comprise other types of facilities, including, without limitation, manufacturing facilities, energy generation facilities, or residential homes in a neighborhood. Accordingly, in various other embodiments, an automation management system deployed within communication system 100 is used to provide automation management systems services relating to industrial automation system management, energy systems management, management of energy consumption within residential neighborhoods, etc.

Routers, and use of routers in a communication system. are well-known. Router 120 facilitates the transmission of communication signals between various components within communication system 100. Router 120 may comprise hardware, software, or a combination of hardware and software. In one embodiment, router 120 may be an Integrated Services Router (ISR) that supports Application eXtension Platform (AXP), available from Cisco Systems, Inc. of San Jose, Calif.

Router 120 may receive data flows in the form of packets. Packets may comprise information identifying a destination component external to router 120. The packets may comprise, for example, Internet Protocol (IP) packets or Transmission Control Protocol (TCP) packets. IP packets and TCP packets are structured based on known IP and TCP packet protocols. However, packets employed in data flows between network devices in communication system 100 may be structured using other network packet protocols.

Figure 2:
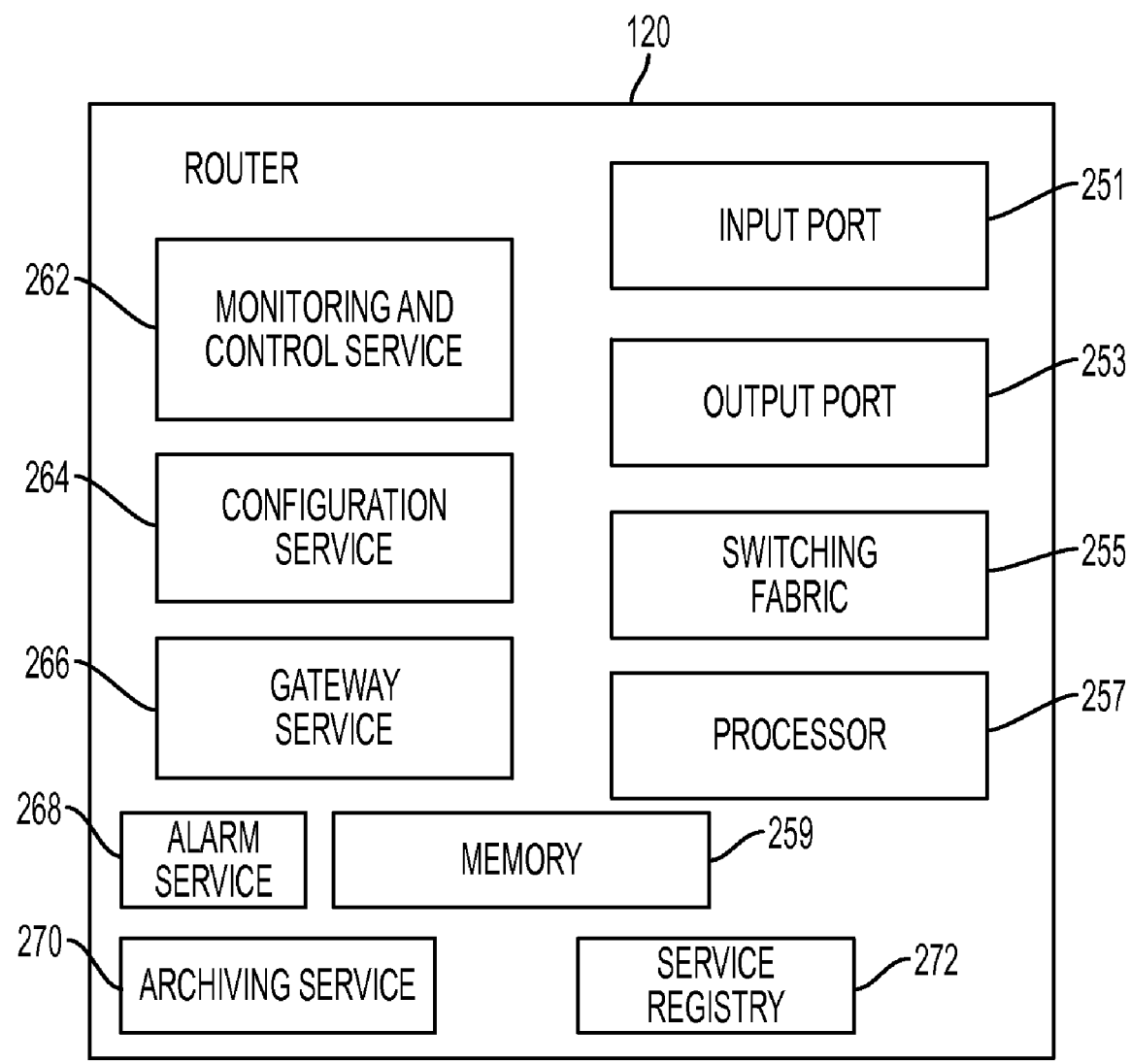
FIG. 2 is a block diagram showing exemplary components of a router, in accordance with an exemplary embodiment of the invention.

FIG. 2 is a block diagram showing exemplary components of a router such as router 120, in accordance with an embodiment of the invention. Router 120 comprises an input port 251, an output port 253, a switching fabric 255, a processor 257, and a memory 259. Input port 251 comprises an interface for receiving input data flows. Input port 251 may comprise a plurality of line cards, for example. Switching fabric 255 connects input port 251 and output port 253. Output port 253 comprises an interface for transmitting output data flows. Output port 253 stores packets and transmits packets on respective output links. Processor 257 controls the operation of various components of router 120, and may direct data flows according to routing protocols. Memory 259 may comprise a non-transitory computer readable medium, such as a magnetic disk, magnetic tape, or optical disk, that includes instructions in the form of computer code that may be executed by processor 257 to perform various functions.

In accordance with an embodiment of the invention, an automation management system is deployed and operates on a network of network devices within communication system 100, and the system is used to provide automation management services. The network devices may comprise a plurality of routers, a plurality of switches, a plurality of hubs, or a combination of different types of network devices. In the exemplary embodiment of FIG. 1, an automation management system is deployed and operates on a network of routers (including routers 120, 125) within communication system 100.

In the exemplary embodiment, an automation management system is deployed, and operates, using a service-oriented architecture, and is used to deploy and operate automation management services within communication system 100. Using a service-oriented architecture, various services are deployed and operate as distinct applications. In addition, the automation management system is distributed. Accordingly, multiple instances of various services are deployed and operate on various network devices within network 105.

For purposes of convenience, various services provided by the automation management system are discussed below with reference to router 120; however, other routers (and/or other network devices) within network 105 may include other instances of the services discussed below.

In accordance with an embodiment of the invention, router 120 comprises additional components that provide automation management system services within communication system 100. As discussed above, a service-oriented architecture is used to provide automation management system services. In the exemplary embodiment shown in FIG. 2, router 120 comprises a monitoring and control service 262, a configuration service 264, a gateway service 266, an alarm service 268, an archiving service 270, and a service registry 272. Other components may be included to perform other tasks related to the provision of automation management services. Various services operating on router 120 may subscribe to other services on router 120 or to services operating on other routers or network devices. Network 105 may comprise one or more additional routers and/or other network devices that comprise components related to the provision of automation management services, and may also comprise one or more routers and/or network devices without such additional components.

In the exemplary embodiment of FIG. 1, the automation management system is distributed and redundant. Thus, monitoring and control service 262 shown in FIG. 2 is a single instance of monitoring and control service 262, configuration service 264 shown in FIG. 2 is a single instance of configuration service 264, etc. Other instances of monitoring and control service 262, configuration service 264, gateway service 266, alarm service 268, archiving service 270, and service registry 272 may reside and operate on other network devices, such as router 125. In some embodiments, multiple instances of a particular service may reside and operate on a single network device. Multiple instances of a particular service may be deployed and distributed for a variety of reasons. For example, each instance of a service may be responsible for a defined geographical area. Multiple instances of a service may also be deployed to achieve redundancy or to facilitate load balancing.

In an embodiment of the invention, services within the automation management system maintain and operate on a process image. The process image comprises a plurality of process objects, and a plurality of process values corresponding to values measured by various sensors with communication system 100. Use of a process image, process objects, and process values to represent aspects of an area in which an automation management system is employed is known.

Monitoring and control service 262 performs monitoring and control services, including monitoring data received from sensors 166, 176. Monitoring and control service 262 may also transmit control signals to sensors 166, 176 and actuators 168, 178. For example, monitoring and control module 262 may receive a pressure reading from a sensor 166 within area 160 and determine that the measurement exceeds a predetermined maximum level. In response, monitoring and control module 262 may transmit a signal to an appropriate actuator 168 to cause a valve to open.

Monitoring and control service 262 may also perform additional services such as data aggregation and optimization. For example, monitoring and control service 262 may monitor an average temperature within area 160, calculated based on data received from multiple sensors. Monitoring and control service 262 may additionally control certain actuators 168 within area 160 to optimize the temperature within a building or within designated areas of a building. Optimization may be performed based on pre-established sets of rules relating to energy consumption, temperature requirements within certain areas of a building, etc. Various other services may subscribe to monitoring and control service 262.

Configuration service 264 maintains information relating to the topology of the automation management system, and information indicating which service instances are located on which network devices. Configuration service 264 also maintains information relating to the configuration data for each respective service instance (e.g., the process objects making up the part of the process image that the service instance is responsible for managing and the association, if any, of a process object and a service instance where the current state of the process object can be obtained). Configuration service 264 also maintains information relating to the configuration data of each gateway service instance (an association of a process object to an I/O address), and a set of rules governing how process objects are distributed to various services. Various other services may subscribe to configuration service 264.

Service registry 272 is a location where services are discoverable. Service registry 272 maintains information indicating what services are available, and the location and/or addresses of various services. Service registry 272 may utilize the UDDI standard or the WS-Discovery standard, for example. Various other services may subscribe to service registry 272.

Gateway service 266 facilitates communications between various components of router 120 and other devices within communication system 100. For example, gateway service 266 may receive data in a first format from base station 161 and reformat the data into a second format used by services within the automation management system. For example, gateway service 266 may abstract away details specific to an I/O device and network and expose the current state of a process object according to a common process image model. Gateway 266 may be deployed on a component of router 120, such as a controller, I/O device, etc capable of connecting to I/O devices over specific field networks. Various other services may subscribe to gateway service 266.

Alarm service 268 monitors selected process values and provides alarm notifications to appropriate services or applications in accordance with predefined sets of rules. For example, alarm service 268 may monitor a process value corresponding to a level of water in a tank. When the level exceeds a predetermined limit, alarm service 268 may issue an alarm to another service, indicating that an operator or repair service is to be notified. Various other services may subscribe to alarm service 268.

Archiving service 270 stores data as instructed by other services or according to predetermined sets of rules. Various other services may subscribe to archiving service 270.

Each of the services described herein may comprise a software program residing in memory 259 that includes multiple modules or subroutines providing respective services or functions, for example. In other embodiments, each service may comprise multiple software programs residing on one or ore computers. In alternative embodiments, each service may comprise hardware (such as an application specific integrated circuit ("ASIC")), or a combination of hardware and software. Each service may comprise a non-transitory computer readable medium, such as a magnetic disk, magnetic tape, or optical disk, that includes instructions in the form of computer code operable to perform various functions.

Methods and systems for deploying and operating an automation management system on a network of network devices are described below. In the discussion below, the term "automation and control service," (or alternatively, "AC service") is used to refer to a service provided within the automation management system described above with reference to FIGS. 1 and 2.

In accordance with embodiments of the invention, deployment and operation of an automation management system within communication system 100 requires deploying and configuring services on network devices in network 105. Multiple instances of a particular service may be deployed and configured on a plurality of network devices. FIGS. 3 through 14 are diagrams illustrating aspects of the configuration and operation of various services within an automation management system. In FIGS. 3 through 14, blocks are used to represent service instances deployed on network devices within network 105. Arrows are used to represent interactions, including communications, between a first service instance and a second service instance. In each diagram, actions occur in an order indicated by letters "A," "B," "C," etc.

Figure 3:
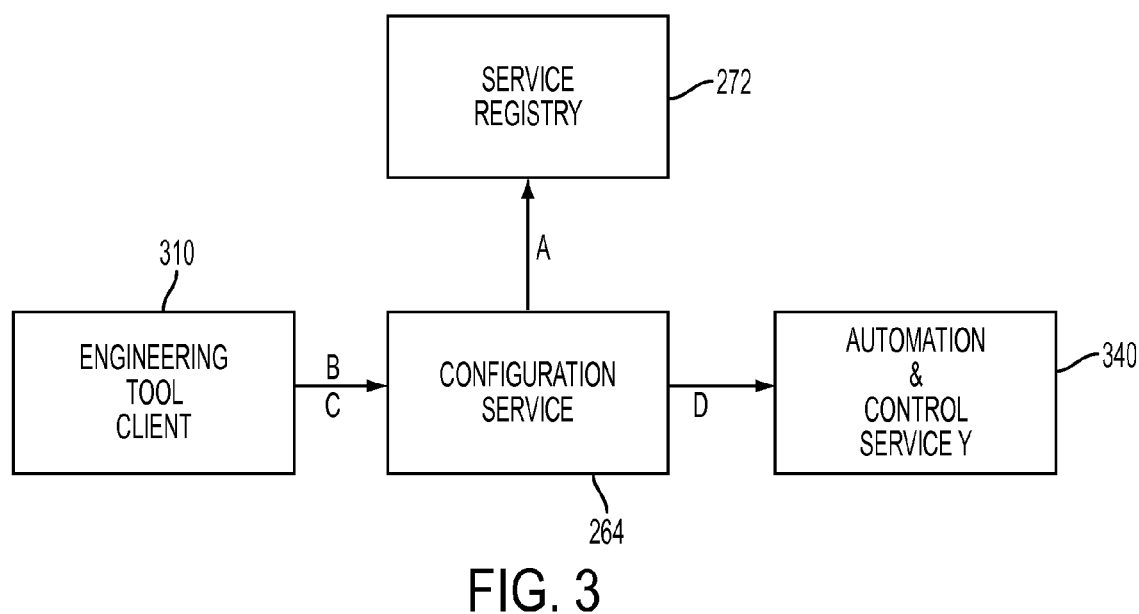
FIG. 3 is a diagram showing a first scenario for configuring an instance of a configuration service, in accordance with an embodiment of the invention.

After a network device, such as router 120, that hosts an instance of configuration service 264 is connected to network 105, the configuration service instance must be configured. FIG. 3 is a diagram showing a first scenario for configuring an instance of configuration service 264, in accordance with an embodiment of the invention. Configuration service instance 264 makes itself discoverable via service registry 272 (step A). This may be achieved, for example, using one of the standard service discovery mechanisms such as UDDI registry or WS-Discovery. At step B, an engineering tool client 310 may be used to populate configuration service instance 264 with a set of rules (e.g., described in XML) defining how to distribute process objects (or divide the process image) amongst the various AC service instances. At step C, the engineering tool client 310 populates configuration service instance 264 with configuration data (e.g., data model and instances of processes)of the processes (i.e., the static process image). Whenever the configuration data managed by configuration service instance 264 is changed (e.g., by engineering tool 310), all affected service instances (such as AC service 340) are notified by configuration service instance 264 (step D). This happens after the change transaction has been successfully completed.

Figure 4:
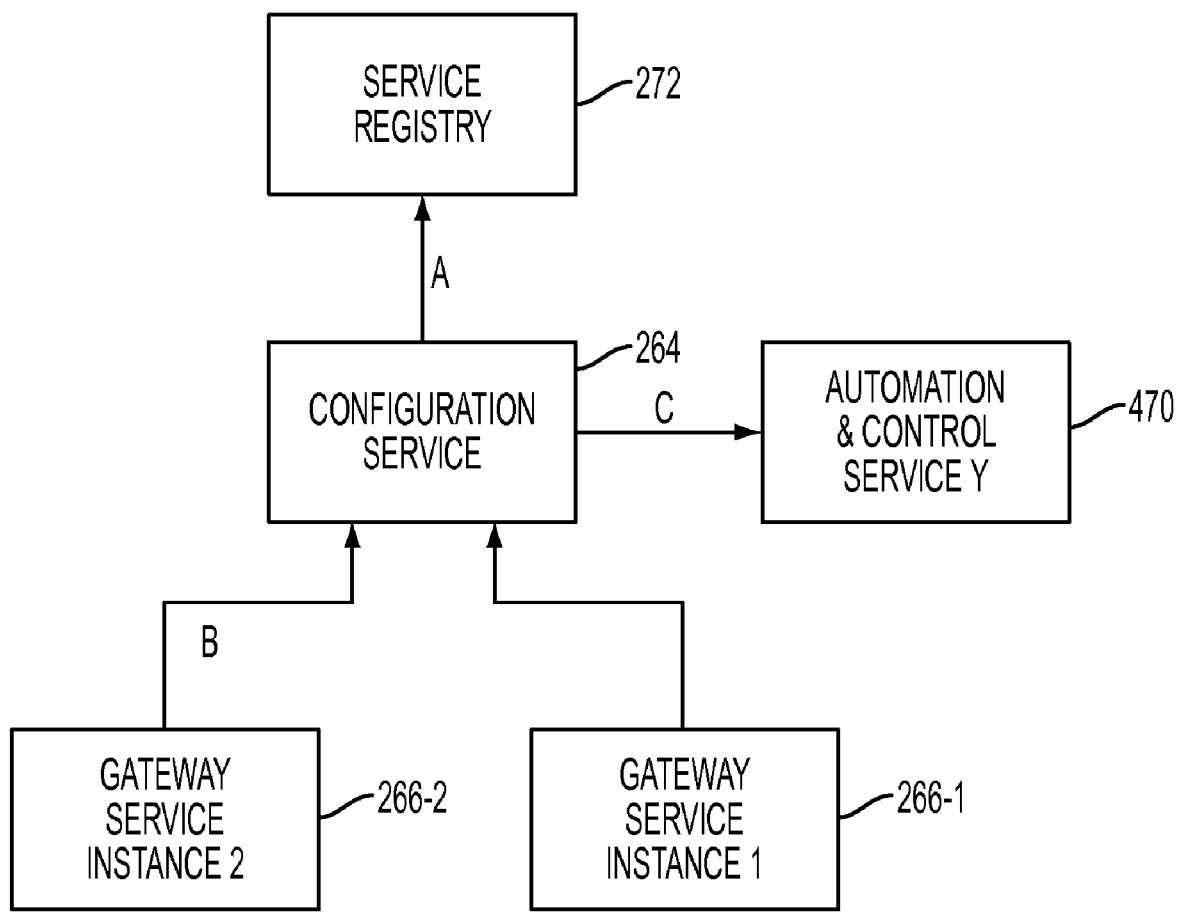
FIG. 4 is a diagram showing a second scenario for configuring a configuration service instance, in accordance with another embodiment of the invention.

FIG. 4 is a diagram illustrating second scenario for configuring configuration service instance 264, in accordance with an embodiment of the invention. Once router 120 hosting configuration service instance 264 is connected to network 105, configuration service instance 264 makes itself discoverable via service registry 272 (step A). This may be achieved, for example, using one of the standard service discovery mechanisms such as UDDI registry or WS-Discovery. At step B, if an instance 266-1 or 266-2 of gateway service 266 is pre-populated with configuration data (i.e. it has its own local configuration data in, e an XML file), then it can populate configuration service instance 264 with this piece of the static process image. Configuration service instance 264 must already be pre-populated with its set of rules to distribute the various process objects among AC services. Whenever the configuration data managed by configuration service instance 264 is changed (e.g., adding additional sensor to the layout), all affected service instances (such as AC service instance 470) are notified by configuration service instance 264 (step C). This happens after the change transaction has been successfully completed.

Figure 5:
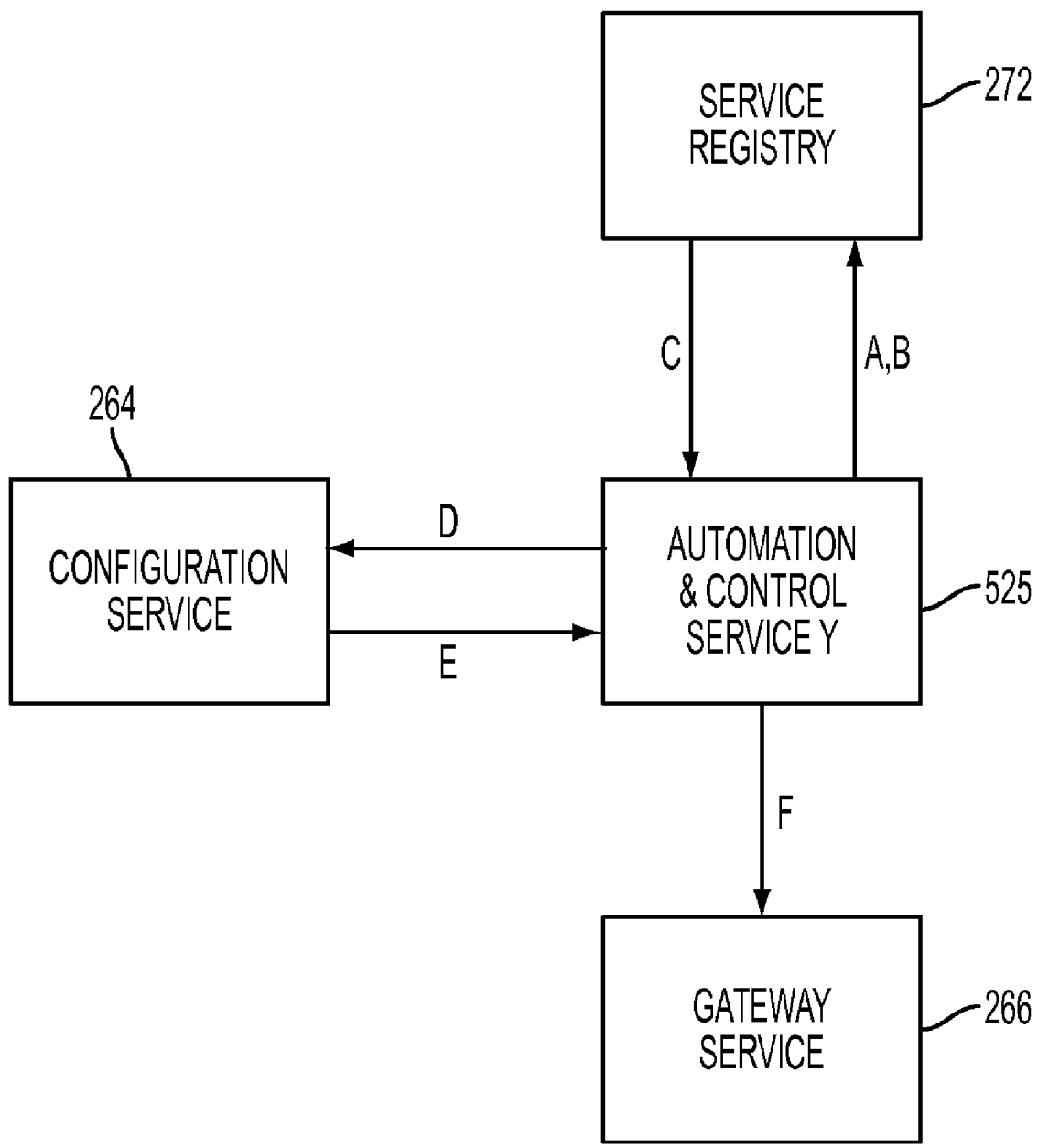
FIG. 5 is a diagram showing a scenario for configuring an automation and control service instance, in accordance with an embodiment of the invention.

After a network device, such as router 120, that hosts an instance of an AC service is connected to network 105, the AC service instance must be configured. FIG. 5 is a diagram illustrating a scenario for configuring an AC service instance 525 (AC service Y), in accordance with an embodiment of the invention. AC service instance 525 makes itself discoverable via service registry 272 using the same service discovery mechanism discussed above (step A). Service Y requests from service registry 272 the location of a configuration service instance (step B). Service registry 272 replies with information concerning configuration service instance 264 (step C). At step D, AC service instance 525 uploads its profile to configuration service instance 264 (i.e., updates to configuration service instance 264 information about AC service instance 525, such as its service endpoint and capabilities). If AC service instance 525 is momentarily disconnected from network 105, then its information in configuration service instance 264 may still remain unchanged. At step E, AC service instance 525 downloads its configuration data (i.e., the part of the process image it is responsible for) from configuration service instance 264. For reasons of efficiency, the download may be performed in a manner similar to a synchronization process, by detecting differences, if any, between the current configuration data of AC service instance 525 and the corresponding configuration data for AC service instance 525 stored in configuration service instance 264, and downloading only the difference to AC service 525. Step E may also be triggered as a result of a configuration change notification from configuration service instance 264. To increase robustness, AC service instance 525 may periodically query configuration service instance 264 for changes. The configuration data may contain such information as which process objects are managed by AC service instance 525 and where (e.g., in which service instance) the current state of a given process object may be obtained. Physical states (including raw sensor data) are usually obtained from gateway services, but there may also be computed states from any service instance. At step F, AC service instance 525 subscribes to respective service instances for process values according to its current configuration data.

Figure 6:
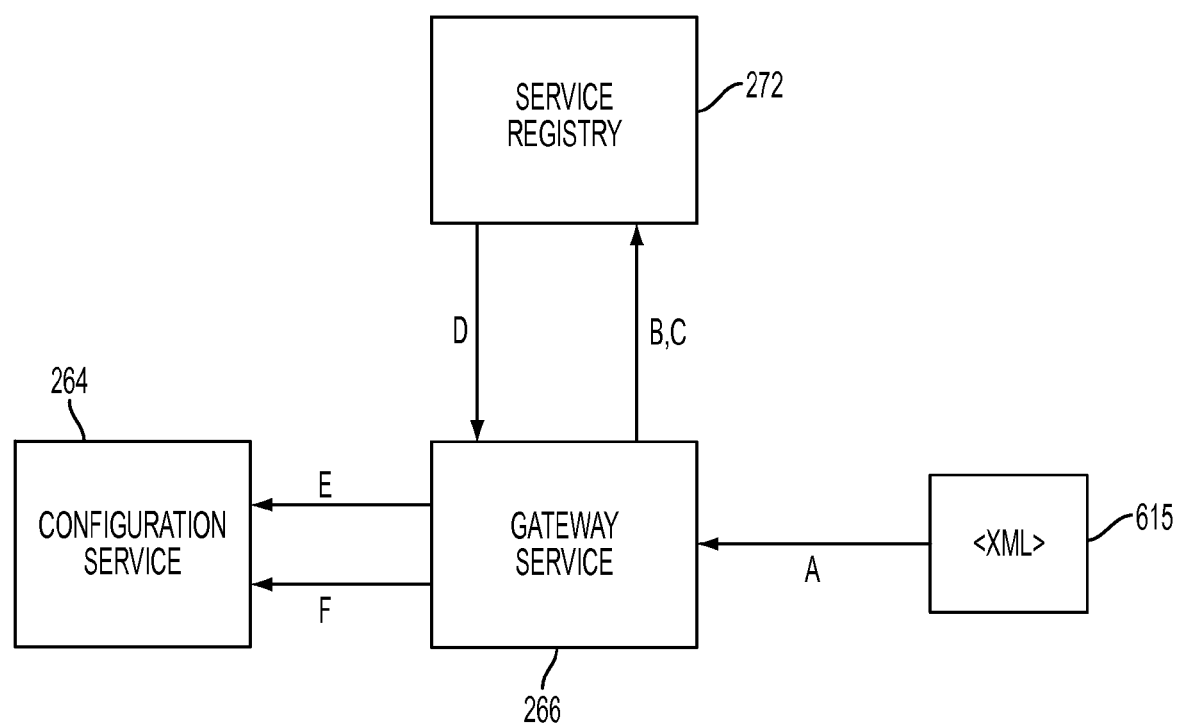
FIG. 6 is a diagram showing a scenario for configuring a gateway service instance, in accordance with an embodiment of the invention.

After a network device, such as router 120, that hosts an instance of gateway service 266 is connected to network 105, the gateway service instance must be configured. In accordance with a first scenario, a gateway service instance, such as gateway service instance 266, may obtain its configuration data in a manner similar to that shown in FIG. 5. A second scenario for a gateway service instance (such as gateway service instance 266) to obtain its configuration data is shown in FIG. 6. At step A, the device hosting gateway service instance 266 is pre-loaded with the configuration data (i.e., it has its own local configuration data in e.g., in an XML file 615). Once the device hosting gateway service instance 266 is connected to the network. it makes itself discoverable (step B). At step C, gateway service instance 266 requests from service registry 272 the location of a configuration service instance. Service registry 272 replies with information concerning configuration service instance 264 (step D). At step E, gateway service instance 266 uploads its profile (e.g. supported interfaces, support eventing and/or polling) to configuration service instance 264. At step F, gateway service instance 266 uploads its configuration data to configuration service instance 264. As described above, the upload process may be a synchronization process where only the difference is uploaded. Step F may be triggered whenever there is a change of configuration in gateway service instance 266 a new XML file).

Figure 7:
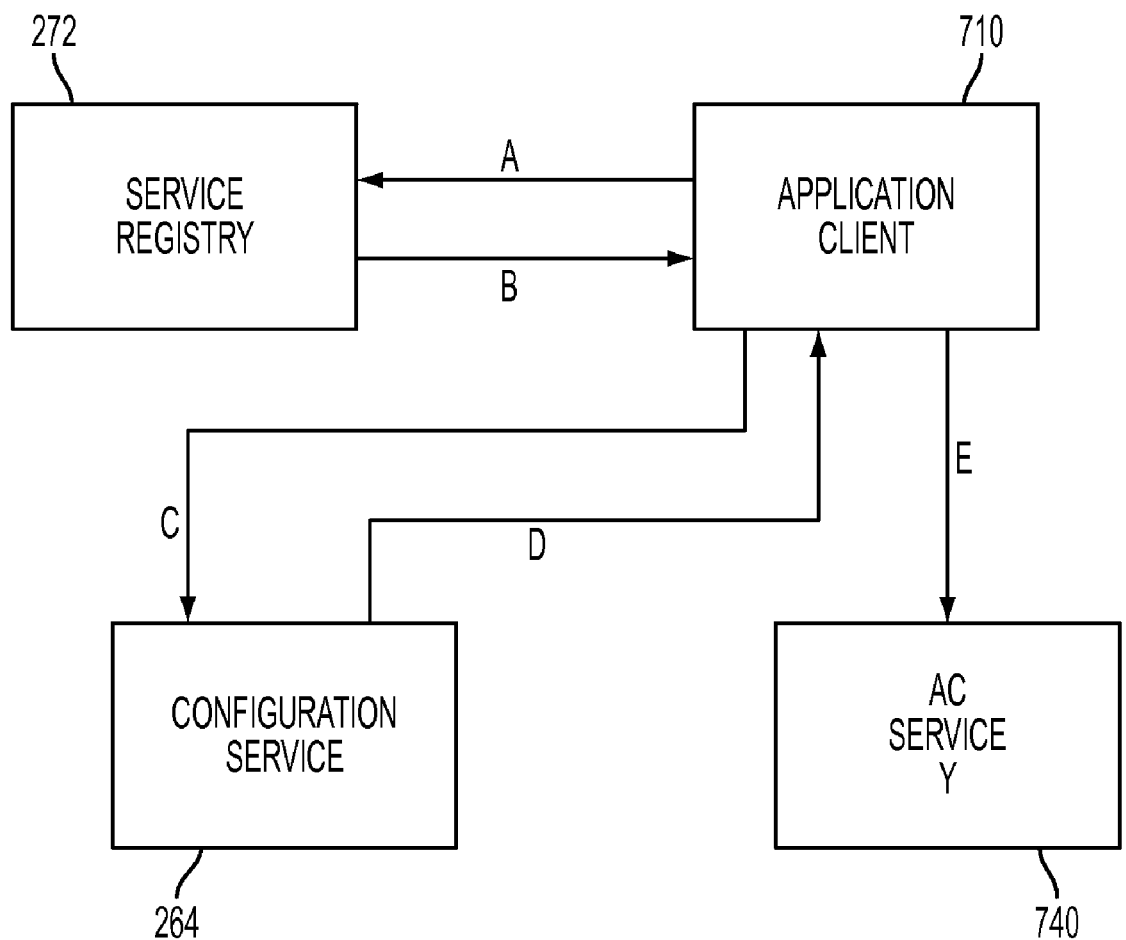
FIG. 7 is a diagram showing a scenario for configuring an application client, in accordance with an embodiment of the invention.

FIG. 7 is a diagram showing a scenario for configuring an application client 710, in accordance with an embodiment of the invention. Application client 710 may reside on a computer operated by an end-user, for example. At step A, application client 710 requests from service registry 272 the location of a configuration service instance. At step B, service registry 272 replies with information concerning configuration service instance 264 (step B). At step C, application client 710 queries configuration service instance 264 to determine where the process objects it is interested in are located. At step D, for each process object of interest, configuration service instance 264 returns information concerning one or more AC service instances responsible for that object. At step E, application client 710 subscribes to the respective AC service instances for the process values.

In accordance with an embodiment of the invention, redundancy is used to increase the availability and robustness of the automation management system. Redundant configuration services are deployed across the network onto multiple network devices, such that multiple network devices each host an instance of the configuration service. When synchronized, all redundant instances of the configuration service will contain the same configuration information.

Figure 8:
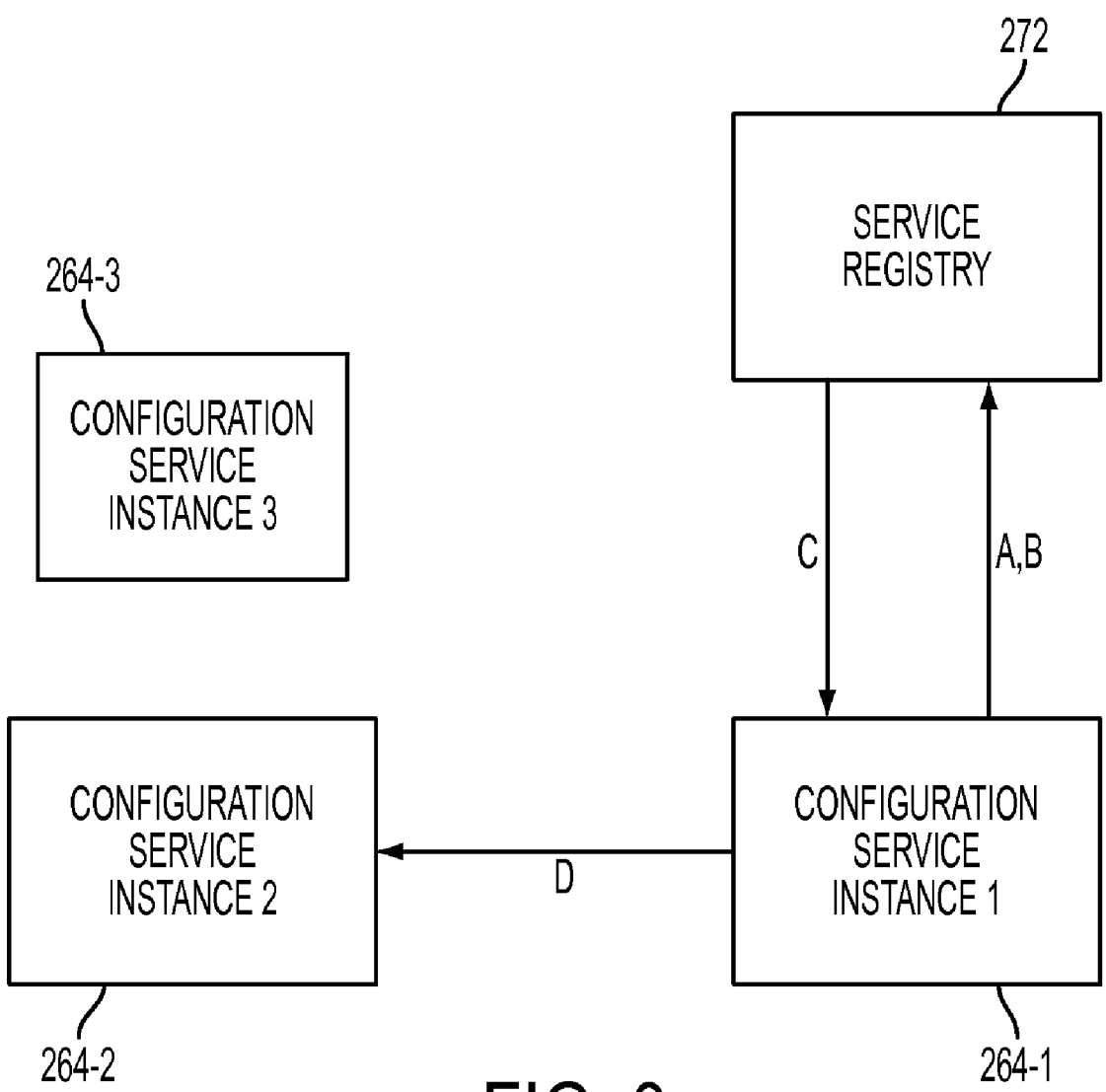
FIG. 8 is a diagram showing a first scenario for synchronizing a redundant configuration service, in accordance with an embodiment of the invention.

FIG. 8 is a diagram showing a first scenario for synchronizing a redundant configuration service, in accordance with an embodiment of the invention. The scenario of FIG. 8 may be used when a redundant configuration service joins the network for the first time. In this embodiment, multiple redundant instances 264-1, 264-2, 264-3, etc., of configuration service 264 reside and operate on various network devices in network 105. At step A, service instance 264-1 of configuration service 264 connects to the network for the first time via the service discovery mechanism. As a result, configuration service instance 264-1 requests from service registry 272 the location of all redundant instances of the same service already in network 105 (step B). At step C, service registry 272 replies with information identifying all redundant configuration service instances (264-2, 264-3, etc.). If the trigger for synchronization is on account of configuration service instance 264-1 connecting to the network, then configuration service instance 264-1 selects, based on a load balancing strategy, one of the redundant instances from which to download the latest configuration information (e.g., instance 264-2).

Figure 9:
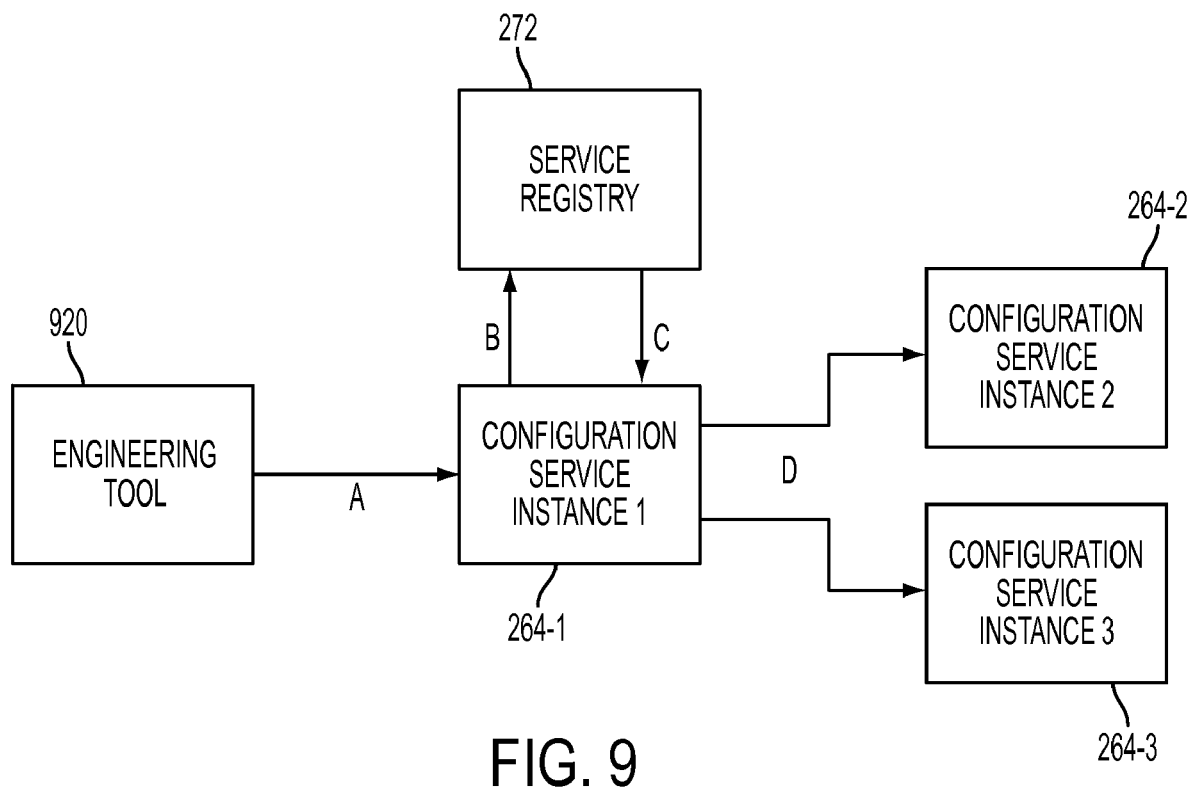
FIG. 9 is a diagram showing a second scenario for synchronizing a redundant configuration service, in accordance with another embodiment of the invention.

FIG. 9 is a diagram showing a second scenario for synchronizing a redundant configuration service, in accordance with an embodiment of the invention. The second scenario may be used when a change in configuration information requires a configuration service to synchronize across all redundant configuration services. At step A, synchronization between the redundant service instances is triggered by a specific event such as when the configuration information of a configuration service instance 264-1 is changed (e.g., by an engineering tool). Upon such an event, configuration service instance 264-1 locates all redundant instances of the same service already in the network (e.g., 264-2, 264-3) via service registry 272 (step B). At step C. service registry 272 replies with information identifying all configuration service instances (e.g., 264-2. 264-3). If the trigger for synchronization is on account of a change in configuration information in configuration service instance 264-1, then configuration service instance 264-1 updates all the redundant service instances (e.g., 264-2, 264-3) with the change (step D). Thereafter, it notifies all the affected service instances (including the redundant e ice instances) of a configuration information change.

Figure 10:
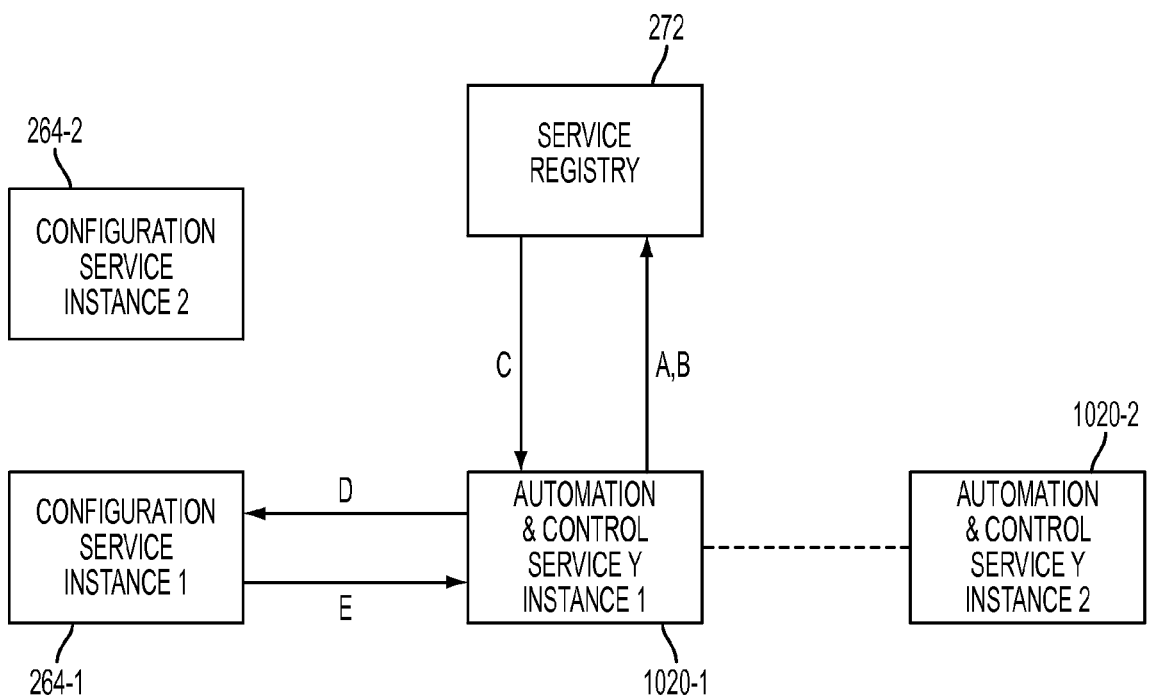
FIG. 10 is a diagram showing a scenario for deploying a redundant automation and control service, in accordance with an embodiment of the invention.

FIG. 10 is a diagram showing a scenario for deploying a redundant automation and control service service, in accordance with an embodiment of the invention. In this embodiment, multiple network devices, each hosting an instance of the same AC service managing the same piece of process image, are deployed in network 105. At step A, the AC service instance 1020-1 makes itself discoverable via service registry 272, using the same service discovery mechanism described above. At step B, AC service instance 1020-1 locates configuration service instance 264-1, using the service discovery mechanism. At step C, when locating configuration service instance 264-1 to update its configuration, AC service instance 1020-1 discovers more than one instance of configuration service 264, since service registry 272 replies with information identifying all instances (e.g., 264-1, 264-2). AC service instance 1020-1 selects, based on a load balancing strategy, configuration service instance 264-1 to upload its profile (step D). At step E, AC service instance 1020-1 downloads its configuration data from configuration service instance 264-1 Configuration service instance 264-1 distributes the configuration information to all instances of AC service 1020. Whether a particular instance of AC service 1020 is configured to be instance 1020-2 (redundant to instance 1020-1), or another AC service instance, is determined by configuration service instance 264-1 There is no synchronization between the redundant AC service instances. Each redundant instance behaves as an independent service instance. This is defined in the basic mechanism for AC services.

Figure 11:
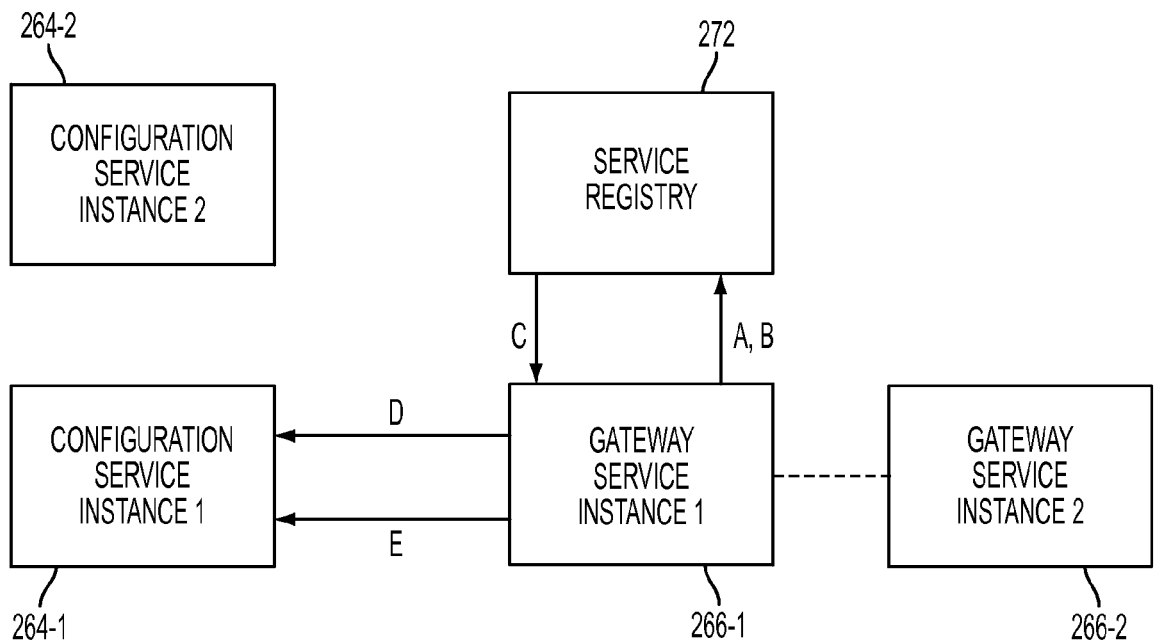
FIG. 11 is a diagram showing a scenario for deploying a redundant gateway service, in accordance with an embodiment of the invention.

FIG. 11 is a diagram showing a scenario for deploying a redundant gateway service 266, in accordance with an embodiment of the invention. In this embodiment, multiple devices, each hosting an instance of gateway service 266 connecting to the same set of I/O devices, are deployed in network 105. At step A, gateway service instance 266-1 makes itself discoverable via service registry 272, using the same service discovery mechanism described above. At step B, gateway service instance 266-1 locates configuration service instance 264-1, using the service discovery mechanism. At step C, when locating configuration service instance 264 to update its configuration, gateway service instance 266-1 (one of the redundant AC service instances) discovers more than one instance of configuration service 264, since service registry 272 replies with all instances (e.g., 264-1, 264-2). At step D, gateway service instance 266-1 selects, based on a load balancing strategy, configuration service instance 264-1 to upload its profile. At step E, gateway service instance 266-1 uploads its configuration data to configuration service instance 264-1. There is no synchronization between the redundant gateway service instances (such as between gateway service instances 266-1 and 266-2). Each redundant instance behaves as an independent service instance, as defined in the basic mechanism for gateway service.

Figure 12:
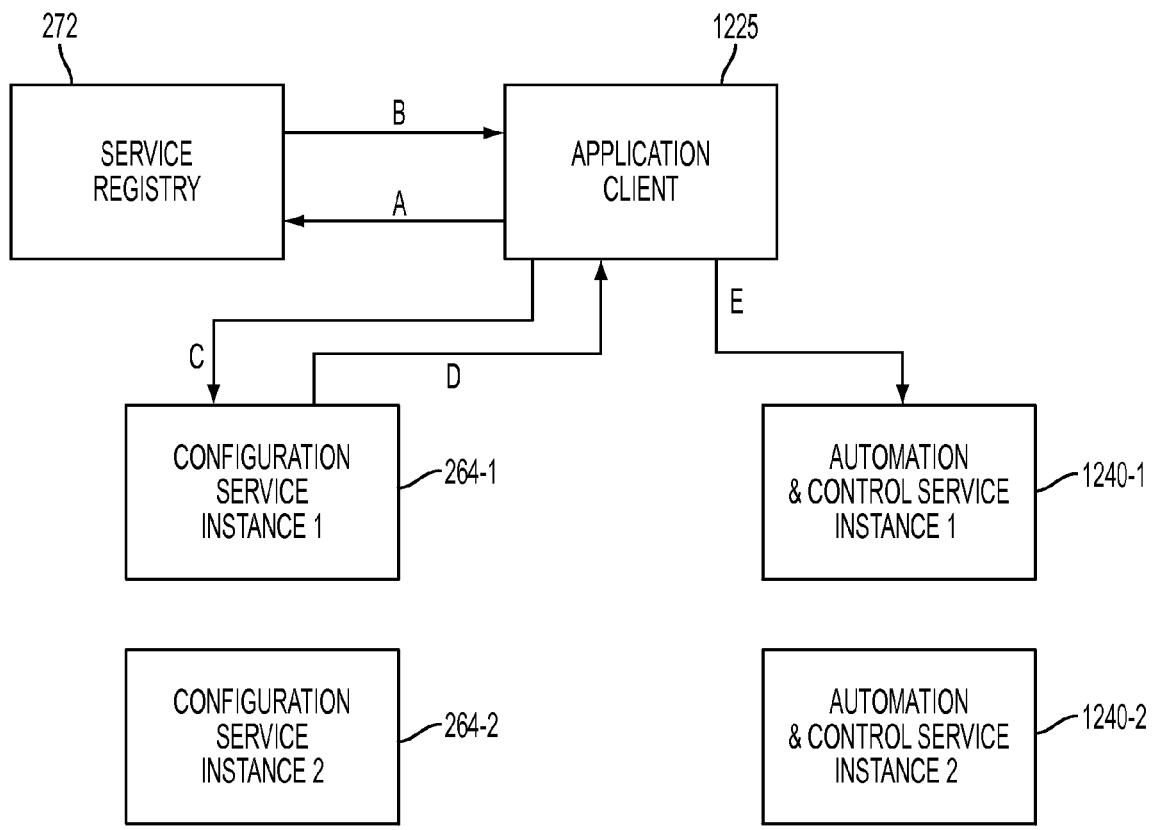
FIG. 12 is a diagram showing a scenario for deploying a redundant application client, in accordance with an embodiment of the invention.

FIG. 12 is a diagram showing a scenario for deploying a redundant application client 1225, in accordance with an embodiment of the invention. At step A, application client 1225 locates configuration service instance 264-1 via service registry 272, using the service discovery mechanism. At step B, service registry 272 replies with all redundant instances of the same service (i.e., 264-1, 264-2). At step C, application client 1225 selects, based on a load balancing strategy, the redundant instance (e.g., 264-1) to query where a desired process object resides. At step D. the query returns all redundant instances of the same AC service 1240 responsible for the process object of interest (i.e., 1240-1 1240-2). At step E, application client 1225 selects, based on a load balancing strategy, the redundant instance of AC service 1240 to subscribe to for the process object state. In this example, application client 1225 subscribes to AC service instance 1240-1.

Figure 13:
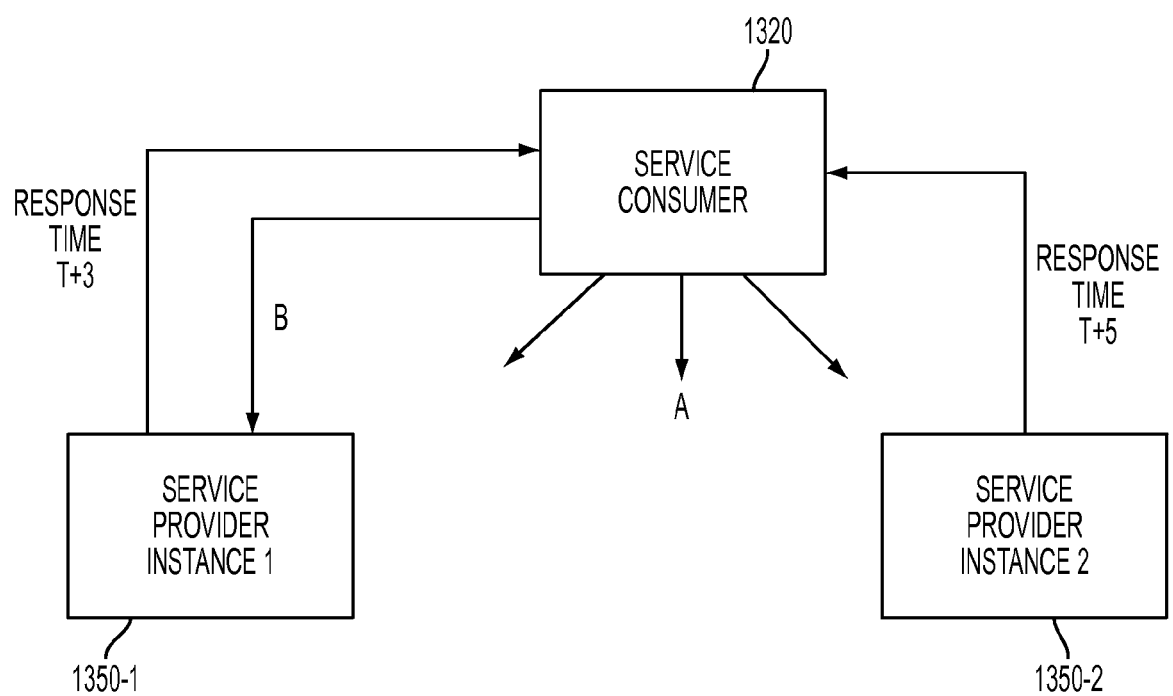
FIG. 13 is a diagram showing a first scenario for achieving load balancing within an automation management system, in accordance with an embodiment of the invention.

Performance in a redundant system can be increased by load balancing between redundant service instances. FIG. 13 is a diagram of a first scenario for achieving load balancing within an automation management system, in accordance with an embodiment of the invention. At step A, a service consumer 1320 (which may be configuration service 264, another AC service, an application client, etc.) multicasts its request to all redundant instances of the same service provider 1350. Various instances 1350-1, 1350-2, etc., of service provider 1350 transmit responses with differing delays measured from the time of the request. At step B, service consumer 1320 selects the service instance that responded to the multicast request first.

Figure 14:
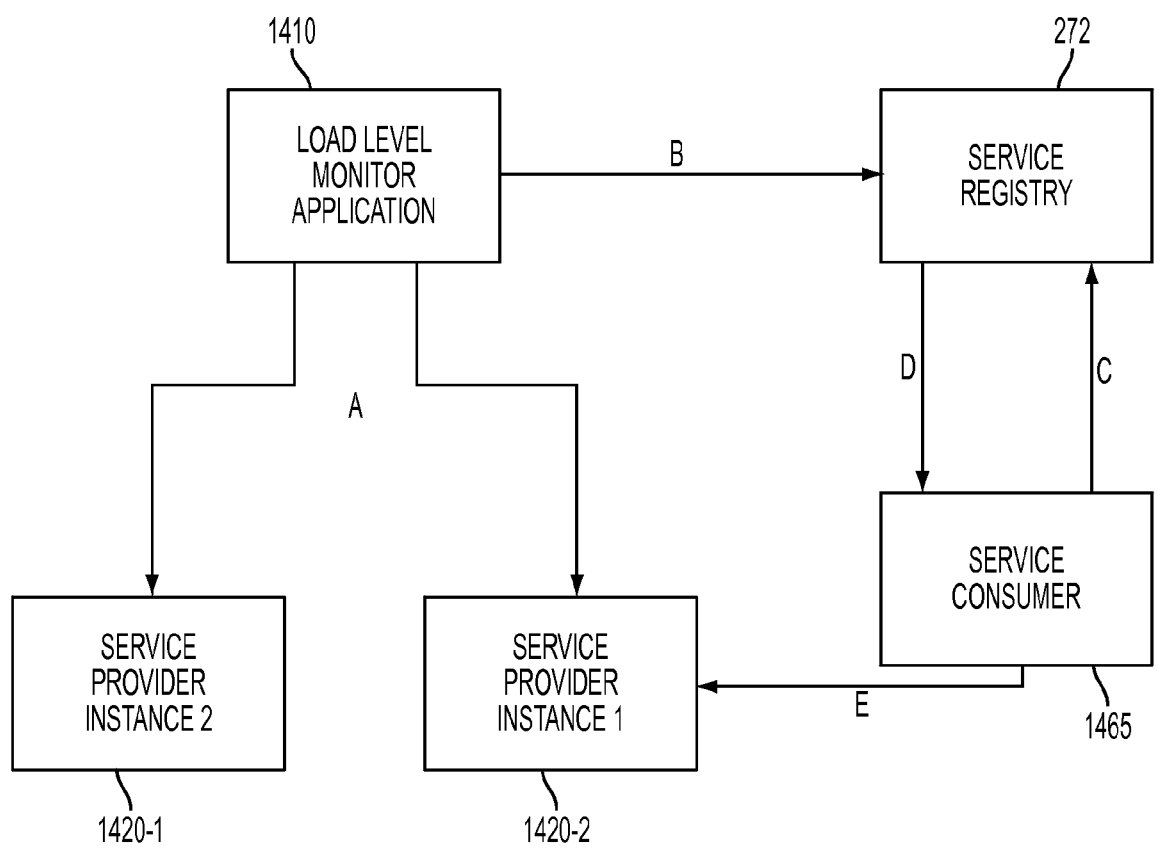
FIG. 14 is a diagram showing a second scenario for achieving load balancing in an automation management system, in accordance with another embodiment of the invention.

FIG. 14 is a diagram of a second scenario for achieving load balancing in an automation management system, in accordance with an embodiment of the invention. At step A, a load level monitor application 1410 monitors load levels among various services. At step B, load level monitor 1410 sends a report to service registry 272. At any time, a service consumer 1465 locates an instance of service provider 1420 via service registry 272, using the discovery mechanism (step C). At step D, service consumer 1465 queries the load levels of all redundant instances of the same service (i.e., 1420-1, 1420-2) and determines the instance with the lowest load (i.e., 1420-1). The load level of a service instance may be maintained in the service registry by a load monitoring service or returned by the service instance in response to the multicast request from the consumer. At step E, service consumer 1465 selects the service provider instance with the lowest load (i.e., 1420-2).

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

The invention claimed is:

1. A system for providing automation management services, the system comprising:
a plurality of routers in a network; and
an automation management system comprising a plurality of services deployed on the plurality of routers in a distributed manner, the plurality of services comprising a first instance of a particular service deployed on a first router and a second instance of the particular service deployed on a second router, the second instance of the particular service being redundant to the first instance;
wherein the particular service is configured to maintain information relating to a process image, the process image comprising a plurality of process objects and a plurality of process values, the process values corresponding to values associated with measurements obtained by a plurality of sensors disposed at a plurality of locations.

2. The system of claim 1, wherein the plurality of services comprise at least one of: a monitoring and control service, a configuration service, a gateway service, an alarm service, an archiving service, and a service registry.

3. The system of claim 2, wherein the particular service is a configuration service configured to maintain information relating to the process image.

4. The system of claim 1, wherein the plurality of services comprises services relating to one of: a building management system, an industrial automation system, and an energy systems management system.

5. The system of claim 1, wherein the plurality of services are deployed on the plurality of routers in accordance with a service-oriented architecture model.

6. A method for providing automation management services, the method comprising:
operating an automation management system comprising a plurality of services deployed on a plurality of routers in a network in a distributed manner using a service oriented architecture, the plurality of services comprising a first instance of a particular service deployed on a first router and a second instance of the particular service deployed on a second router, the second instance of the particular service being redundant to the first instance, wherein the particular service is configured to maintain information relating to a process image, the process image comprising a plurality of process objects and a plurality of process values, the process values corresponding to values associated with measurements obtained by a plurality of sensors disposed at a plurality of locations; and
providing, by a selected instance of the particular service, at least one automation management service associated with the particular service with respect to at least one process object within the process image.

7. The method of claim 6, wherein the step of operating an automation management system further comprises:
operating the plurality of services on the plurality of routers.

8. The method of claim 7, further comprising:
operating the first instance of the particular service on the first router; and
operating the second instance of the particular service on the second router.

9. The method of claim 7, wherein the plurality of services comprise at least one of: a monitoring and control service, a configuration service, a gateway service, an alarm service, an archiving service, and a service registry.

10. The method of claim 9, wherein the particular service is a configuration service configured to maintain information relating to the process image.

11. The method of claim 7, wherein the plurality of services comprises services relating to one of: a building management system, an industrial automation system, and an energy systems management system.

12. The method of claim 7, further comprising:
operating the plurality of services on the plurality of routers in accordance with a service-oriented architecture model.

13. The method of claim 12, further comprising:
deploying the plurality of services on the plurality of routers in accordance with a service-oriented architecture model.

14. The method of claim 13, further comprising configuring an instance of a configuration service in the automation management system by performing the following steps:
communicating with a registry service operating in the automation management system, by a configuration service instance, in order to make itself discoverable; and
populating the configuration service instance with a set of rules defining how to distribute process objects to instances of services.

15. The method of claim 13, further comprising configuring an instance of an automation and control service in the automation management system by performing the following steps:
communicating with a registry service operating in the automation management system, by an instance of an automation and control service, in order to make itself discoverable;
receiving, by the automation and control service instance, information identifying a configuration service in the automation system management system;
uploading a profile to the configuration service; and
downloading configuration data from the configuration service.

16. The method of claim 13, further comprising synchronizing a redundant configuration service in the automation management system by performing the following steps:
receiving, by an instance of a configuration service, from a service registry, information identifying one or more redundant instances of the configuration service;
selecting, based on a load balancing strategy, one of the one or more redundant instances; and
downloading configuration information from the selected redundant instance.

17. The method of claim 13, further comprising performing load balancing within the automation management system by performing the following steps:
multicasting, by an instance of a first service operating in the automation management system, a request to a plurality of redundant instances of a second service in the automation management system;
receiving, from the plurality of redundant instances, responses with differing delays; and
selecting a service instance based on the received responses.

* * * * *